US008442023B2

United States Patent
Ghanadan et al.

(10) Patent No.: US 8,442,023 B2
(45) Date of Patent: May 14, 2013

(54) SYSTEM AND METHOD FOR ASSIGNING TIME SLOTS FOR TRANSMISSION OF PACKETS IN A WIRELESS COMMUNICATION NETWORK UTILIZING KNOWLEDGE OF A DATA PATH

(75) Inventors: Reza Ghanadan, Berkeley Heights, NJ (US); Jessica Y. Hsu, Washington, DC (US); Phong C. Khuu, Ashburn, VA (US); Brian Loop, Fairfax, VA (US); Michael J. Weber, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 535 days.

(21) Appl. No.: 12/760,133

(22) Filed: Apr. 14, 2010

(65) Prior Publication Data

US 2010/0260131 A1    Oct. 14, 2010

Related U.S. Application Data

(60) Provisional application No. 61/212,618, filed on Apr. 14, 2009.

(51) Int. Cl.
  *H04B 7/212*     (2006.01)
  *H04L 12/28*     (2006.01)
(52) U.S. Cl.
  USPC ........................................ 370/347; 370/395.4

(58) Field of Classification Search .................. None
  See application file for complete search history.

(56) References Cited

U.S. PATENT DOCUMENTS

2007/0274320 A1* 11/2007 Joshi et al. .................. 370/395.2
2009/0147731 A1*  6/2009 Chion et al. .................. 370/328

OTHER PUBLICATIONS

Ephremides A. ; Truong T. V., Scheduling broadcasts in multihop radio networks IEEE transactions on automatic control Y. 1990, vol. 38, No. 4, pp. 456-460.

(Continued)

*Primary Examiner* — Kwang B Yao
*Assistant Examiner* — Tung Q Tran
(74) *Attorney, Agent, or Firm* — Dilworth & Barrese, LLP; Michael J. Musella

(57) ABSTRACT

A node in a wireless communication network comprises a processor that receives information regarding a first plurality of packets to be transmitted in an epoch, a first path of nodes for the first plurality of packets, and a first flow rate. The processor receives information regarding a second plurality of packets to be transmitted in the epoch, a second path of nodes for the second plurality of packets, and a second flow rate. The processor determines weights for the paths based on the flow rates. The processor assigns pipelines for the paths and creates groups of pipelines based on the weights. The groups may be assigned to a schedule.

20 Claims, 6 Drawing Sheets

OTHER PUBLICATIONS

Wang, G. Ansari, N. Optimal Broadcast Scheduling in Packet Radio Networks Using Mean Field Annealing (1997) Gangsheng Wang, Nirwan Ansari, Senior Member IEEE Journal on Selected Areas in Communications.

Haixiang Shi Lipo Wang Sch. of Electr. & Electron. Eng., Nanyang Technol. Univ., Singapore Neural Networks, 2005. IJCNN '05. Proceedings. 2005 IEEE International Joint Conference on A hybrid neural network for optimal TDMA transmission scheduling in packet radio networks.

Jun-Chieh Chen Ting, I. Chih-Lin I Jiunn-Tsair Chen Inst. of Commun. Eng., Nat. Tsing Hua Univ., Hsinchu, Taiwan A novel broadcast scheduling strategy using factor graphs and sum-product algorithm. A mixed neural-genetic algorithm for the broadcast scheduling problem Salcedo-Sanz, S.; Bousono-Calzon, C.; Figueiras-Vidal, A.R.; Dept. of Signal Theor. & Commun., Univ. Carlos de Madrid, Leganes-Madrid, Spain Wireless Communications, IEEE Transactions on Mar. 10, 2003 vol. 2, Issue:2; pp. 277-283.

Vergados, D.D. Vergados, D.J. Douligeris, C. Tombros, S.L. QoS-aware TDMA for end-to-end traffic scheduling in ad hoc networks Aegean Univ. Wireless Communications, IEEE Issue Date: Oct. 2006.

Vergados, D. J. Koutsogiannaki, M. Vergados, D. D. Loumos, V. Pantazis, N. Enhanced End-to-End TDMA for wireless ad-hoc networks National Technical University of Athens, School of Electrical and Computer Engineering, djvergad@telcom.ntua,gr, el01696@mail.ntua.gr Computers and Communications, 2007. ISCC 2007. 12th IEEE Symposium on Issue Date: Jul. 1-4, 2007.

* cited by examiner

SYSTEM AND METHOD FOR ASSIGNING TIME SLOTS FOR TRANSMISSION OF PACKETS IN A WIRELESS COMMUNICATION NETWORK UTILIZING KNOWLEDGE OF A DATA PATH

This application claims priority to U.S. Provisional application No. 61/212,618, filed Apr. 14, 2009 entitled "SYSTEM AND METHOD FOR ASSIGNING TIME SLOTS FOR TRANSMISSION OF PACKETS IN A WIRELESS COMMUNICATION NETWORK UTILIZING KNOWLEDGE OF A DATA PATH", the entirety of which is hereby incorporated by reference.

FIELD OF THE INVENTION

The disclosure relates to a system and method for assigning time slots for transmission of packets in a wireless communication network and, more particularly, to a system and method for assigning time slots based on a path of the data packets.

DESCRIPTION OF THE RELATED ART

In networked communication, two or more nodes communicate information to each other. The information may be transmitted in discrete pieces or packets. One type of network is a mobile ad hoc network (MANET). Referring to FIG. 1, physically, a MANET 50 may include a number of geographically distributed, potentially mobile nodes 52, 54, 58a, 58b, 58c transmitting and receiving data packets over links 56 using one or more frequency ranges or radio channels. Compared with other types of networks, such as cellular networks or satellite networks, MANETS frequently lack fixed infrastructure. The network is formed of mobile (and potentially stationary) nodes, and may be dynamically created as the nodes start and stop communicating with each other. The network does not depend on any particular node and dynamically adjusts as some nodes join or others leave the network.

Several routing and scheduling schemes have been proposed to transmit data packets in MANETS. Some examples include the Distributed Dynamic End-to-End TDMA Scheduling Algorithm (DDETSA), Distributed Dynamic End-to-End TDMA Scheduling and Routing Algorithm in Multi-Hop Ad Hoc Networks (DDETSRAM) and Dynamic Routing Algorithm Using TDMA Scheduling in Multi-Hop Ad-Hoc Networks (DRATSAN).

DDETSA—The DDETSA selects the route for each packet that produces the smallest end-to-end delay, based on reserved slots at each node. This algorithm requires that certain slots in a communication epoch be reserved for packet communication.

DDETSRAM—DDETSRAM's goal is to balance the utilization of each node, so that highly utilized nodes are assigned additional time slots only if necessary, and paths with non-utilized nodes are used when available. In order to select a path, the number of free slots in every node in the path must be known. For each potential path, the node with the fewest free slots is identified, and is called the bottleneck node of the path. The path with the highest number of free slots in the bottleneck node that also fulfills the end-to-end delay requirements is then selected.

DRATSAN—DRATSAN tries to estimate the "popularity" of each node to identify which of the nodes are most commonly used when transmitting packets. Assignment of data packets to these popular nodes is avoided and non-popular nodes are used when possible, allowing the popular nodes to be used in the future when required.

This disclosure describes an improvement over these prior art approaches.

SUMMARY OF THE INVENTION

One embodiment of the invention is a node in a wireless communication network. The node comprises an antenna; a transmitter in communication with the antenna; and a processor in communication with the transmitter. The processor is effective to receive information regarding a plurality of packets to be transmitted from a source node and a path of nodes for the packets; assign a schedule of slots for the packets, the assign the schedule includes the processor being effective to assign a first slot to the source node; and assign a next slot to a next node in the path, the next slot being at a first time that the next node can transmit after receiving one of the packets. The processor is further effective to repeat the assign the next slot until all nodes in the path are assigned; and assign a respective another slot for each orphan node not in the path.

Another embodiment of the invention is a node in a communication network. The node comprises an antenna; a transmitter in communication with the antenna; and a processor in communication with the transmitter. The processor is effective to receive information regarding a first plurality of packets to be transmitted in an epoch, a first path of nodes for the first plurality of packets, and a first flow rate. The processor is further effective to receive information regarding a second plurality of packets to be transmitted in the epoch, a second path of nodes for the second plurality of packets, and a second flow rate; determine a first weight for the first path based on the first and second flow rate; and determine a second weight for the second path based on the first and second flow rate. The processor is further effective to assign a first pipeline of slots for both the first and second path; assign slots for any orphan nodes not in the first and second paths; and assign a second pipeline of slots for the first path. The processor is further effective to assign a third pipeline of slots for the second path; and assign the first pipeline to a schedule. The processor is further effective to assign at least one of the pipelines to the schedule based on the first and second weights.

Yet another embodiment of the invention is a method for assigning a schedule for transmission ordering in a wireless communication network. The method comprises receiving, by a processor, information regarding a plurality of packets to be transmitted from a source node and a path of nodes for the packets; and assigning, by the processor, a schedule of slots for the packets by performing the steps of assigning a first slot to the source node; assigning a next slot to a next node in the path, the next slot being at a first time that the next node can transmit after receiving one of the packets; repeating assigning the next slot until all nodes in the path are assigned; and assigning a respective another slot for each orphan node not in the path.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENTS

Figure 1:
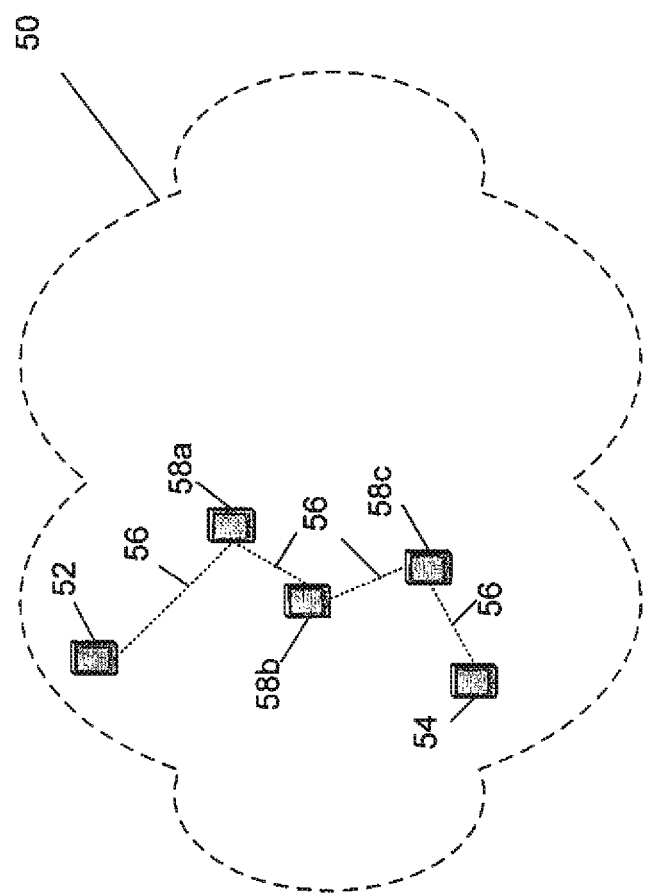
FIG. 1 is a network diagram of a wireless communication network in accordance with the prior art.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Network communications frequently map to the OSI (Open Systems Interconnection) model. The OSI model is an abstract description for layered communications and computer network protocol design. Conceptually, these models divide network architecture into seven layers which, from top to bottom, are the Application, Presentation, Session, Transport, Network, Data-Link, and Physical layers. A layer can be thought of as a collection of conceptually similar functions that provide services to the layer above it and receive services from the layer below it. For example, a layer that provides error-free communications across a network provides the path needed by applications above it, and it calls the next lower layer to send and receive packets that make up the contents of the path.

In prior art communication systems in each node, the Network layer typically provides the Link layer with a set of packets to be sent to a destination node. The Link layer, in turn, determines how to move each packet from the current node to the next node. However, the inventors have determined that communications could be handled more efficiently if the network layer could provide more detailed information about the network and how packets should be moved from a source node to a destination node including information about the data path itself.

In half duplex TDMA (time division multiple access) systems, a node cannot simultaneously transmit and receive packets. Time is partitioned into fixed-interval blocks called timeslots or slots. To avoid collisions in one hop (communication from one node to the next node) network environments each timeslot is assigned to a single node. In multi-hop (communication from a source node, to an intermediate node, and then to a destination node) network environments where the interference range of each node's transmission is limited, concurrent transmissions in the same slot may be scheduled among nodes whose neighbors are outside of the other transmitting nodes' interference range. This spatial re-use capability helps increase the network capacity and may be exploited by the slot scheduler implementing a slot scheduling algorithm that designates the time slots when packets should be transmitted. However, for network nodes within an interfering range, the slot scheduler should coordinate slot assignments to avoid collisions.

Schedulers may be used in stationary networks where the timeslot allotment may be determined manually for optimal performance based on fixed traffic pattern assumptions. The pre-determined schedule is then configured into the network nodes. However, in MANETs, the volatile network topology results in rerouting events where a dynamic scheduler should be used in order to maintain more efficient transport performance. Existing dynamic schedulers have been concerned only with providing collision-free slot assignments to service the user traffic load presented by higher network stack layers. These schedulers have not considered the end-to-end traffic transport requirements when they perform the slot allocation. Stated another way, useful information about a data path known by the Network layer is not shared with the Link layer. Instead, each node independently and greedily negotiates for slot assignments to service its own queues. In doing so, nodes in a path may be competing with each other for the link resources inside local collision domains (1-hop neighborhoods). As a result, the overall network performance falls short of the best possible schedule.

The inventor(s) have determined that significant packet transmission performance gains may be achieved from a cross-layer-informed intelligent TDMA slot scheduler (hereinafter "cross-layer scheduler"). The cross-layer scheduler may consider user traffic requirements and available routing information when making slot assignment decisions. In particular, the cross-layer scheduler may coordinate and order time slot assignment among the nodes in the data path in patterns that will yield the minimal end-to-end delay and the needed throughput.

The prior art dynamic scheduler schemes referenced above address path selection aspects and propose various QoS (Quality of Service) routing schemes to select paths. These schemes may consider the link and path conditions such as how many slots are available at each node and path (as proposed in DDETSA and DDETSRAM respectively) and may avoid more heavily utilized nodes (as proposed in DRATSAN). However, they do not address slot assignment nor determine a transport performance impact of the ordering of slot(s) assigned to nodes along a data path.

A cross-layer scheduler as discussed herein can assign and coordinate slots among the nodes in a path into a pattern which will minimize the end-to-end transport delay and maximize throughput performance for the user traffic transport over that path. The slot assignment is accomplished by having the dynamic scheduler (or a processor with a slot schedule algorithm) use routing information from the network layer.

Figure 2:
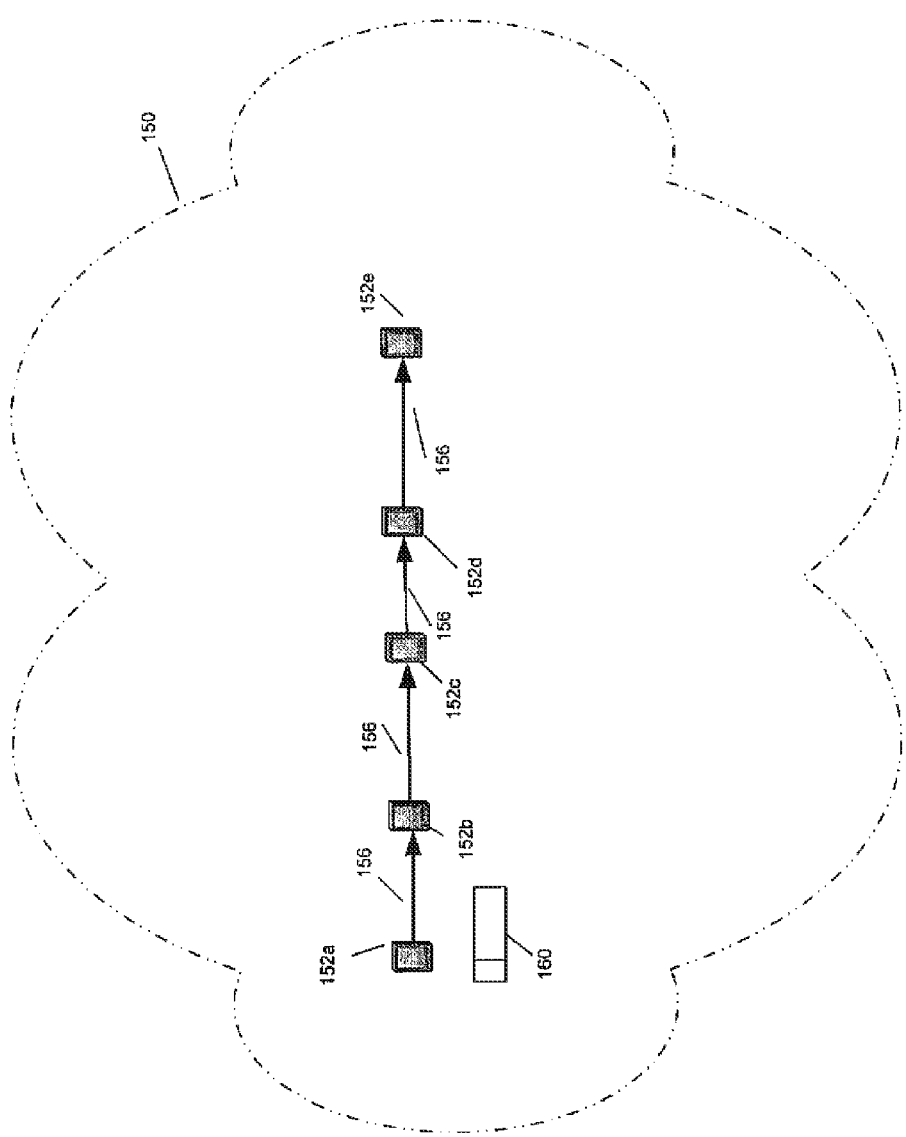
FIG. 2 is network diagram of a wireless communication network in accordance with an embodiment of the invention.
Figure 3:
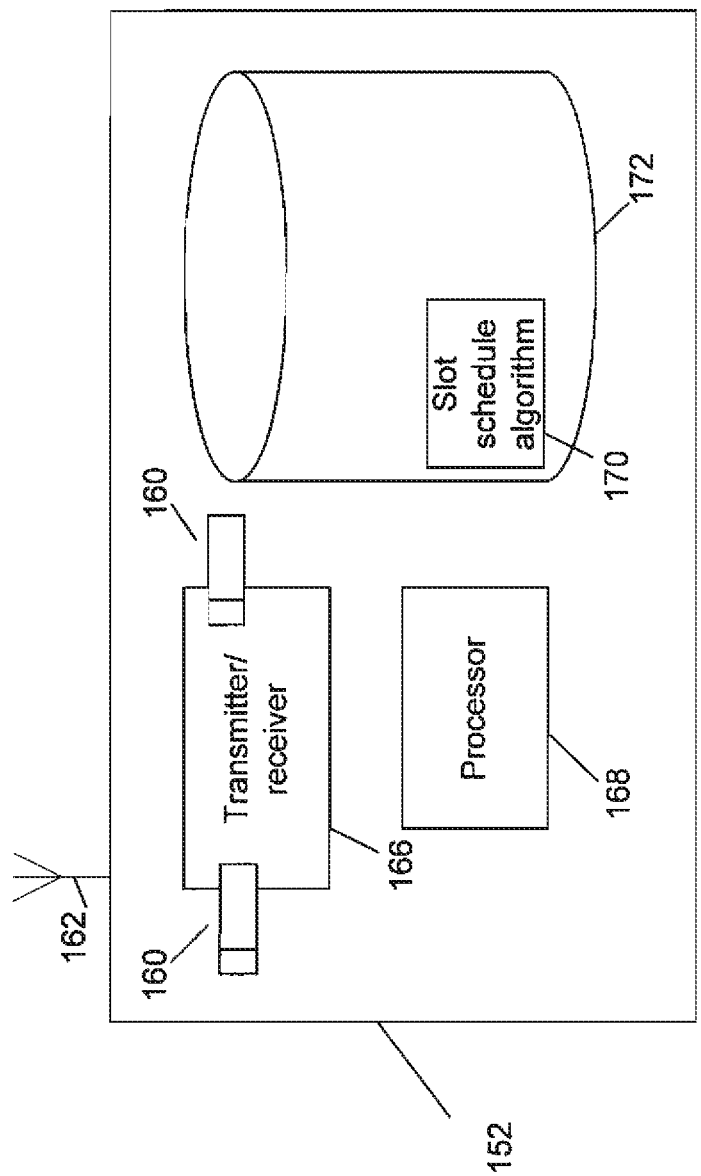
FIG. 3 is a system diagram of a node accordance with an embodiment of the invention.

Referring to FIG. 2, there is shown a wireless network 150 in accordance with an embodiment of the invention. In wireless network 150, nodes 152 may transmit and receive packets of information 160 using communication links 156. It is desirable that adjacent nodes do not communicate at the same time (e.g., nodes 152*a* and 152*b* do not transmit at the same time or nodes 152*a* and 152*c* do not transmit to node 152*b* at the same time) because the communications may interfere with one another. As shown in FIG. 3, each node 152 may include an antenna 162, a transmitter/receiver 166 and a memory 172 including a slot schedule algorithm and slot assignments produced by the algorithm 170 all in communication with a processor 168.

Network 150 could be in a simple string of pearls network topology such as in the form: 1-2-3-4-5-6-7-8-9-10 where each node N can communicate with at most two neighbors, N−1 and N+1. An optimal schedule may include some or all of the following properties:

Every node has at least one transmit opportunity in an epoch;

No collisions are allowed;

It is not possible to arrange the schedule to achieve lower latency or higher throughput for the identified flow;

Broadcast slot allocation is available;

Slot size and epoch length are fixed.

Other network model assumptions may include:

Availability of path trace information from source to destination node;

Each network link is half duplex TDMA based;

Given a path, the network will attempt to allocate a schedule to provide the lowest possible end-to-end delay and maximum throughput;

Each node is able to receive a packet on slot N and retransmit the same packet on slot N+1.

Minimum latency may be achieved when a node forwards a packet to the next node in the path as soon as possible after the packet is available. This holds true for the source node of the path as well as nodes in the middle of the path. A corollary concept is that maximum bandwidth is achieved by injecting and servicing as many packets per unit time into the network path pipeline as possible. If at any point a packet has to wait a slot length or more at a node for transmission, the pipeline has stalled.

The concept of spatial reuse may be leveraged where two nodes are allowed to transmit in the same slot as long as they do not have any 1-hop neighbors in common.

For example, assume a packet is pending transmission at node 1 and needs to be transmitted to node 4 in the string of pearls example. Starting with slot 1, slot schedule algorithm 170 (FIG. 3) may assign node 1 to transmit in slot 1:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   |   |   |   |   |   |   |    |

Through application of the simple spatial reuse rule, slot schedule algorithm 170 may also assign nodes 4, 7, and 10 a transmit time in slot 1 as well:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |

The above fills up slot 1 assignment. At a time corresponding to slot 2, node 2 is now in possession of the packet transmitted from node 1. We want node 2 to forward the packet as soon as possible, so slot schedule algorithm 170 assigns node 2 a transmit time in slot 2:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   |   |   |   |   |   |    |

Through application of the simple spatial reuse rule, slot schedule algorithm 170 may also assign nodes 5 and 8 a transmit time in slot 2:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   | T |   |   | T |   |    |

The above fills up slot 2. At a time corresponding to slot 3, node 3 is now in possession of the packet from node 1. We want to send the packet as soon as possible to node 4 and complete the path. So, for the next slot, slot 3, slot schedule algorithm 170 assigns node 3 a transmit time:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   | T |   |   | T |   |    |
| 3    |      |   | T |   |   |   |   |   |   |    |

Through application of the simple spatial reuse rule, slot schedule algorithm 170 may also assign nodes 6 and 9 a transmit time assignment in slot 3:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   | T |   |   | T |   |    |
| 3    |      |   | T |   |   | T |   |   | T |    |

The above slot schedule completes the path from nodes 1 to 4 in three hops, the minimum possible. It also allows every node to transmit at least once in three slots and does not allow any collisions. It is therefore an optimal schedule for a path from node 1 to node 4. Slot schedule algorithm 170 can repeat this three-slot pattern to fill any epoch with a multiple of three slots and maintain the performance characteristics of the schedule; 3-slot latency from node 1 to 4, and one packet delivered to node 4 every three slot lengths. For example:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   | T |   |   | T |   |    |
| 3    |      |   | T |   |   | T |   |   | T |    |
| 4    | T    |   |   | T |   |   | T |   |   | T  |
| 5    |      | T |   |   | T |   |   | T |   |    |
| 6    |      |   | T |   |   | T |   |   | T |    |
| 7    | T    |   |   | T |   |   | T |   |   | T  |
| 8    |      | T |   |   | T |   |   | T |   |    |
| 9    |      |   | T |   |   | T |   |   | T |    |

It is interesting to note that no matter how many nodes there are beyond node 4, by repeating the densest possible spatial reuse pattern, the same 3-slot pattern appears. This is due to the spatial reuse rules that created the pattern in the first place. These rules do not change by adding nodes to the network.

It is also interesting to note that the length of the path does not alter the optimal schedule in this topology. If the path is longer than three hops, the same optimal schedule results.

If the path is shorter than three hops and the network contains more than two nodes, the optimal schedule is no longer so simple because the desire to have a node transmit as soon as it has a packet to forward interferes with the desire to have all nodes with an opportunity to transmit. For example, if the source and destination are adjacent, the minimum latency and maximum bandwidth are achieved by assigning the source node a transmit time in every slot. However, this prevents ever assigning a transmit time to the destination node, a violation of the optimal schedule assumptions. A similar conflict arises for a path length of two hops. The spatial reuse and collision-free schedule assumptions make it difficult to create the minimum latency and maximum bandwidth schedule. For example:

Referring still to network 150 in FIG. 2, if transmitting from node 1 to node 2 with minimum latency or maximum bandwidth: nodes 2 and 3 never transmit as they would interfere with transmission from node 1.

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    | T    |   |   |   | T |   |   | T |   |    |
| 3    | T    |   |   |   |   | T |   |   | T |    |
| 4    | ...  |   |   |   |   |   |   |   |   |    |

If transmitting from node 1 to node 3 with minimum latency or maximum bandwidth: node 3 never transmits as either node 4 (because of spatial reuse with node 1) or node 2 are always transmitting.

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      | T |   |   | T |   |   | T |   |    |
| 3    | T    |   |   |   |   | T |   |   | T |    |
| 4    |      | T |   |   | T |   |   | T |   |    |
| 5    | T    |   |   | T |   |   | T |   |   | T  |
| 6    |      | T |   |   | T |   |   | T |   |    |
| 7    | T    |   |   | T |   |   | T |   |   | T  |
| 8    |      | T |   | T |   |   | T |   |   |    |
| 9    | ...  |   |   |   |   |   |   |   |   |    |

The inventors realized that the optimal schedule path length is bounded on the low end by the highest neighborhood density along the path that cannot be accommodated by spatial reuse.

In the event that a node cannot turn around a packet and transmit the packet in the slot after the packet was received, the schedule pipeline stretches a bit but the pattern is similar. Assume again that node 1 is transmitting a packet destined for node 4, and give node 1 a transmit time assignment in slot 1 and nodes 4, 7, and 10 their spatial reuse assignments:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |

In the example, the first time that node 2 could forward the packet would be slot 3, so slot schedule algorithm 170 may assign node 2 a transmit time in slot 3. Slot schedule algorithm 170 also assigns nodes 5 and 8 transmit times in slot 3 via spatial reuse:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      |   |   |   |   |   |   |   |   |    |
| 3    |      | T |   |   | T |   |   | T |   |    |

The first time that node 3 could forward the packet would be slot 5, so slot schedule algorithm 170 may assign node 3 a transmit time in slot 5. Slot schedule algorithm 170 also assigns nodes 5 and 8 transmit times in slot 5 via spatial reuse:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    |      |   |   |   |   |   |   |   |   |    |
| 3    |      | T |   |   | T |   |   | T |   |    |
| 4    |      |   |   |   |   |   |   |   |   |    |
| 5    |      |   | T |   |   | T |   |   | T |    |

Now slots 2 and 4 need to be assigned. Assuming that a node can receive a packet while the node is performing muting functions on a packet received earlier, the schedule can be filled with additional packet transmit opportunities (time slot assignments) as follows:

|      | Node |   |   |   |   |   |   |   |   |    |
|------|------|---|---|---|---|---|---|---|---|----|
| Slot | 1    | 2 | 3 | 4 | 5 | 6 | 7 | 8 | 9 | 10 |
| 1    | T    |   |   | T |   |   | T |   |   | T  |
| 2    | T    |   |   | T |   |   | T |   |   | T  |
| 3    |      | T |   |   | T |   |   | T |   |    |
| 4    |      | T |   |   | T |   |   | T |   |    |
| 5    |      |   | T |   |   | T |   |   | T |    |
| 6    |      |   | T |   |   | T |   |   | T |    |

So, with the addition of a 1-slot latency in forwarding, the optimal schedule length has doubled to 6 slots. Latency has increased to 5 slots from 3, since 1 slot latency was added at each of the two intermediate hops. However, bandwidth has remained the same; 2 packets are delivered every 6 slots, equivalent to 1 every 3 in the long term. Bandwidth is also therefore a function of spatial reuse and not necessarily the path length or latency.

Based on the above analysis, the inventors have determined that the governing behaviors to assemble an optimal schedule are:

1. For each data path, form a delivery schedule with fewest stalls possible.

2. Try to keep the schedule pattern as short as possible.

3. Leverage spatial reuse intelligently to accommodate "aliasing" to compact the schedule pipeline into fewer schedule slots.

Heuristic Algorithms for Cross-Layer Scheduler

Two heuristic algorithms for a cross-layer scheduler are discussed below. These algorithms could be stored as slot schedule algorithm 170 (FIG. 3) at each node 152 (FIG. 2) or stored at a location accessible by all nodes 152. As each node 152 performs the same slot schedule algorithm, packets may be assigned slots by all nodes in a manner that efficiently moves the packets from sources to destinations. The algorithms are:

Non-input load aware schedule algorithm;
Input load aware schedule algorithm.

Figure 4:
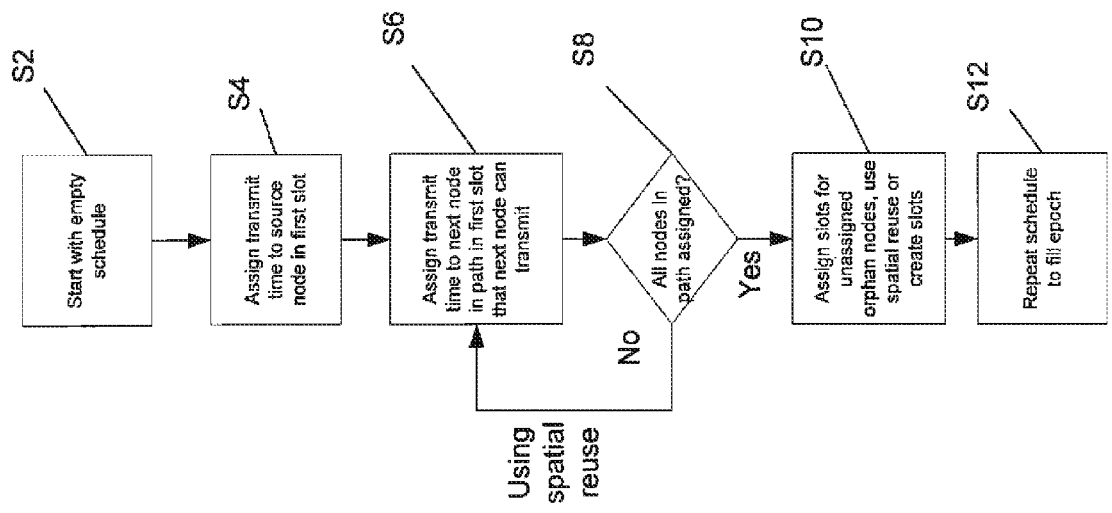
FIG. 4 is a flow diagram of a process which could be performed in accordance with an embodiment of the invention.

Referring to FIG. 4, a non-input load aware schedule algorithm that maximizes the throughput and provides lowest feasible end-to-end delay performance may include the following steps for transmitting a packet from a source node to a destination node along a path.

At step S2, start with an empty schedule.

At step S4, assign a transmit time to the source node of the path in the first slot.

At step S6, assign a transmit time to the next node in the path in the first slot that the next node is able to forward the packet. If the nodes have a zero-slot forwarding latency, this could be the very next slot. Otherwise, this may be two slots out, or three, or whatever the processing latency is. Create a new slot if needed.

At step S8, determine whether all nodes in the path have been assigned a slot. If nodes in the path have not been assigned a slot, repeat step S6 for each remaining node in the path, while checking to see if each node can be assigned (or already has been assigned) a slot using spatial reuse. Steps S6 and S8 attempt to create an optimal pipeline of data transmitted in a schedule.

When the last node in the path has been assigned a slot as evaluated in step S8, in step S10, evaluate the schedule to see if there are any orphan nodes which do not have any transmit slot assignments. If so, look for a slot in which these orphan nodes could be assigned a transmit slot allowable by spatial reuse constraints. If no slot exists which can accommodate another transmit assignment for the orphan node, create a new slot to accommodate the orphan node. This new slot will create at least one pipeline stall per epoch per slot addition, so it is desirable to minimize the number of such slots created. As an option, these new slots can be added to the top of the epoch. At step S12 the slots assigned from steps S4 and S6 are repeated as many times as possible to fill the epoch.

The above algorithm may be used in network scenarios where the user traffic throughput requirements and end-to-end delay performance are not known. The path trace information is still used. Below is a more detailed look at the algorithm via pseudo-code where the destination node is considered as an orphan node.

Main Process

```
Input = {list of all paths, list of all nodes in the network, nodes'
    processing_delay}
Output = {time slot assignment for all nodes in the network in an
    epoch}
Clear Schedule
Allocate Pipeline {list of all paths, nodes' processing delay}
Allocate_Slots {list of orphan nodes}
```

```
While Schedule is not full
    Allocate Pipeline {list of all paths, nodes' processing delay}
end While loop
```

Allocate Pipeline

```
Input = {list of paths, nodes' processing delay}
Output = {time slot(s) reserved for each node and for all nodes in
    all paths from the input list with
    processing delay at each node taken into consideration}
For w =1 to path list
    For k=1 to nodes in path(w) listed in accordance with their
transmission ordering with the source node listed first
        Allocate Slots {node(w,k), nodes' processing delay}
    end For k Loop
end For w Loop
```

Allocate Slots

```
Input = {node list, nodes' processing delay}
Output = {each node in the list assigned to 1slot }
For i=1 to node list
    x = slot index of a Spatial Reuse Slot Available for node(i)
    If slot x is valid then
        Assign node(i) to slot x considering processing delay,
    else
        Find next free slot in the epoch
        Assign node(w,k) to this free slot considering the node's processing
        delay,
    end if
end For i loop
```

A Spatial Reuse Slot Available is considered "valid" if a slot already reserved for one node can be reused for another node based on the 2-hop spatial re-use assumption.

A simple 7-node notional network as shown below is used to explain the non-input load algorithm outlined above. Assume a data flow has been defined by the Network layer to send a packet from node 1 to node 6. Assume also the epoch is 25 slots total.

With the data flow from node 1 to node 6, step S2 says start with an empty schedule and step S4 says assign the source node (node 1) a transmit time in the first slot.

|  | Node | | | | | | |
|---|---|---|---|---|---|---|---|
| Slot | 1 | 2 | 3 | 4 | 5 | 6 | 7 |
| 1 | T | | | | | | |

Now, step S6 says to assign a transmit time slot to the next node in the path in the first slot that the node is able to forward the packet. If we assume processing is fast enough to offer no extra slot latency, node 2 can forward the packet in slot 2. An unassigned slot is used since nodes 1 and 2 cannot transmit simultaneously without collision:

|      | Node |   |   |   |   |   |   |
|------|------|---|---|---|---|---|---|
| Slot | 1    | 2 | 3 | 4 | 5 | 6 | 7 |
| 1    | T    |   |   |   |   |   |   |
| 2    |      | T |   |   |   |   |   |

More nodes in the path need to be assigned (step S8) so the algorithm repeats step S6, first checking to see if the algorithm can assign a transmit time in an existing slot, for the remaining nodes in the path. Node 3 cannot transmit at the same time as node 1, so the algorithm should not assign node 3 a transmit time in slot 1. Similarly, node 3 cannot transmit simultaneously with node 2 without collisions, so the algorithm should not assign node 3 a transmit time in slot 2 either. An option left is to use another unassigned slot (slot 3) for node 3 to transmit in:

|      | Node |   |   |   |   |   |   |
|------|------|---|---|---|---|---|---|
| Slot | 1    | 2 | 3 | 4 | 5 | 6 | 7 |
| 1    | T    |   |   |   |   |   |   |
| 2    |      | T |   |   |   |   |   |
| 3    |      |   | T |   |   |   |   |

Node 4 is the next node in the path. The algorithm evaluates the slots assigned so far, in order, looking for a place to assign node 4 a transmit slot. Looking at slot 1, node 4 may be assigned a transmit time at the same time as node 1, the only other node so far with a transmit time in slot 1. A characteristic of this particular topology is that if you repeat the three slots generated so far in order to form the schedule, node 4 will have just received a packet to forward from node 3 in slot 3 by the time slot 1 reoccurs, assuming that slot schedule algorithm 170 continues the delivery schedule uninterrupted. So, slot schedule algorithm 170 assigns node 4 a transmit time in slot 1 and proceeds to evaluate node 5.

|      | Node |   |   |   |   |   |   |
|------|------|---|---|---|---|---|---|
| Slot | 1    | 2 | 3 | 4 | 5 | 6 | 7 |
| 1    | T    |   |   | T |   |   |   |
| 2    |      | T |   |   |   |   |   |
| 3    |      |   | T |   |   |   |   |

Node 5 cannot transmit in slot 1 without collision, but it can in slot 2.

|      | Node |   |   |   |   |   |   |
|------|------|---|---|---|---|---|---|
| Slot | 1    | 2 | 3 | 4 | 5 | 6 | 7 |
| 1    | T    |   |   | T |   |   |   |
| 2    |      | T |   |   | T |   |   |
| 3    |      |   | T |   |   |   |   |

The optimal pipeline is three slots long and delivers one packet every 3 slots to the destination. The minimum theoretical latency is 5 slots. The maximum theoretical bandwidth is one slot's worth of data every three slot durations. But, slot schedule algorithm 170 is not done with the schedule yet, since it has to schedule 25 slots in the epoch, and also since it has not yet managed to assign all nodes a transmit opportunity. Having assigned a transmit time to all nodes in the path, control branches from step S8 to step S10.

Step S10 says to assign slots for any orphan nodes which do not have any transmit slot assignments. In this case, we have two nodes—nodes 6 and 7. Step S10 says to look for spatial reuse opportunities in the schedule generated so far that can accommodate the orphan nodes. In this case, there are three slots generated. Neither node 6 nor node 7 can be accommodated in slot 1 or slot 2. In slot 3, only node 6 can be accommodated. So, the algorithm is able to accommodate one of the orphan nodes, but not both:

|      | Node |   |   |   |   |   |   |
|------|------|---|---|---|---|---|---|
| Slot | 1    | 2 | 3 | 4 | 5 | 6 | 7 |
| 1    | T    |   |   | T |   |   |   |
| 2    |      | T |   |   | T |   |   |
| 3    |      |   | T |   |   | T |   |

So, step S10 of the algorithm says to at least one slot for node 7 to transmit somewhere in the 25-slot epoch. Taking the option presented in step S10, this slot can be allocated at the top of the schedule and move the three previously generated slots "down" one in time:

|      | Node |   |   |   |   |   |   |
|------|------|---|---|---|---|---|---|
| Slot | 1    | 2 | 3 | 4 | 5 | 6 | 7 |
| 1    |      |   |   |   |   |   | T |
| 2    | T    |   |   | T |   |   |   |
| 3    |      | T |   |   | T |   |   |
| 4    |      |   | T |   |   | T |   |

We now have a four-slot schedule that provides every node a transmit opportunity. But, we need to schedule a 25-slot epoch. Taking the guidance in step S12, the algorithm repeats the schedule for epoch.

|      | Node |   |   |   |   |   |   |
|------|------|---|---|---|---|---|---|
| Slot | 1    | 2 | 3 | 4 | 5 | 6 | 7 |
| 1    |      |   |   |   |   |   | T |
| 2    | T    |   |   | T |   |   |   |
| 3    |      | T |   |   | T |   |   |
| 4    |      |   | T |   |   | T |   |
| 5    | T    |   |   | T |   |   |   |
| 6    |      | T |   |   | T |   |   |
| 7    |      |   | T |   |   | T |   |
| 8    | T    |   |   | T |   |   |   |
| 9    |      | T |   |   | T |   |   |
| 10   |      |   | T |   |   | T |   |
| 11   | T    |   |   | T |   |   |   |
| 12   |      | T |   |   | T |   |   |
| 13   |      |   | T |   |   | T |   |
| 14   | T    |   |   | T |   |   |   |
| 15   |      | T |   |   | T |   |   |
| 16   |      |   | T |   |   | T |   |
| 17   | T    |   |   | T |   |   |   |
| 18   |      | T |   |   | T |   |   |
| 19   |      |   | T |   |   | T |   |
| 20   | T    |   |   | T |   |   |   |
| 21   |      | T |   |   | T |   |   |
| 22   |      |   | T |   |   | T |   |

-continued

| Slot | Node | | | | | | |
|---|---|---|---|---|---|---|---|
| | 1 | 2 | 3 | 4 | 5 | 6 | 7 |
| 23 | T | | | T | | | |
| 24 | | T | | | T | | |
| 25 | | | T | | | | T |

At the end of 25 slots, 7 packets will have been received by the destination and eight will have been injected into the pipeline (count the 'T's in columns 1 and 6). If the schedule repeats forever, ⅞ of the packets will have been received with a latency of 5 slots, and ⅛ of the packets will have been received with a latency of 6 slots, for an average latency of 5.125 slot durations. If the schedule repeats forever, there will be 8 packets injected and 8 packets received every 25 slots, for a bandwidth of (8*slot capacity)/(25*slot duration). If slot capacity/slot duration normalizes to 1, the bandwidth coefficient could be said to be ⁸⁄₂₅ or 0.32 for comparison purposes. The highest achievable bandwidth coefficient would be 0.3333, if we left node 7 out and had an epoch length that was a perfect multiple of the 3 slot schedule.

If the epoch had been 16 slots instead of 25, the metrics would have been slightly worse. Average latency would increase to 5.2 slot durations, and bandwidth would decrease to (⁵⁄₁₆) or 0.3125. Increasing the epoch to 100 makes the metrics slightly better. These epoch length impacts are expected, since the schedule is interrupted ("stalled") for a proportionately shorter or longer time as the epoch length is changed. The impact on node 7 is individually greater, however.

Slot schedule algorithm 170 could assign node 1 a transmit role in slot 1 along with node 7. The impact would be that in each 25 slots, 9 packets would be injected, but only 8 delivered. The result is a queue buildup at node 2, since node 2 does not have sufficient transmit opportunities in the schedule to keep up with node 1's increased pipeline injection rate. Eventually, node 2 may drop packets injected by node 1 due to queue size limits. Notice that the bandwidth of the end-to-end flow is not improved; it is still 8 packets delivered every epoch. The algorithm could double the epoch to 50 slots by copying the pattern shown above and then modify slot 26 to give node 2 an extra transmit slot along with node 7, but this just pushes the problem one hop to the right, where it can no longer be addressed due to the neighborhood size around node 4. Assuming you had a topology in which you could extend the epoch or change the schedule each epoch to move the "extra" transmit opportunity along the path to prevent queue buildup, the efficiency in this topology would move from 0.3125 to no better than 0.3333, or a maximum 6.6%. Much of this efficiency, if not more bandwidth than recovered, would be consumed by the coordinating effort.

The above example used only one extra slot to accommodate orphan nodes not allocated a transmit opportunity within the pipeline length through the benefits of spatial reuse. In examples requiring more slots to accommodate all nodes, the efficiency deltas with different length epochs would be greater. These curves are easily plotted by comparing the number of "overhead" slots required per epoch vs. the number of "pipeline" slots per epoch. For example, our sample schedule has 1 in 25 slots as "overhead," a 4% loss, and the optimal bandwidth coefficient (0.3333) minus 4% equals the 0.32 bandwidth coefficient calculated with the packets received over time method described above.

Figure 5:
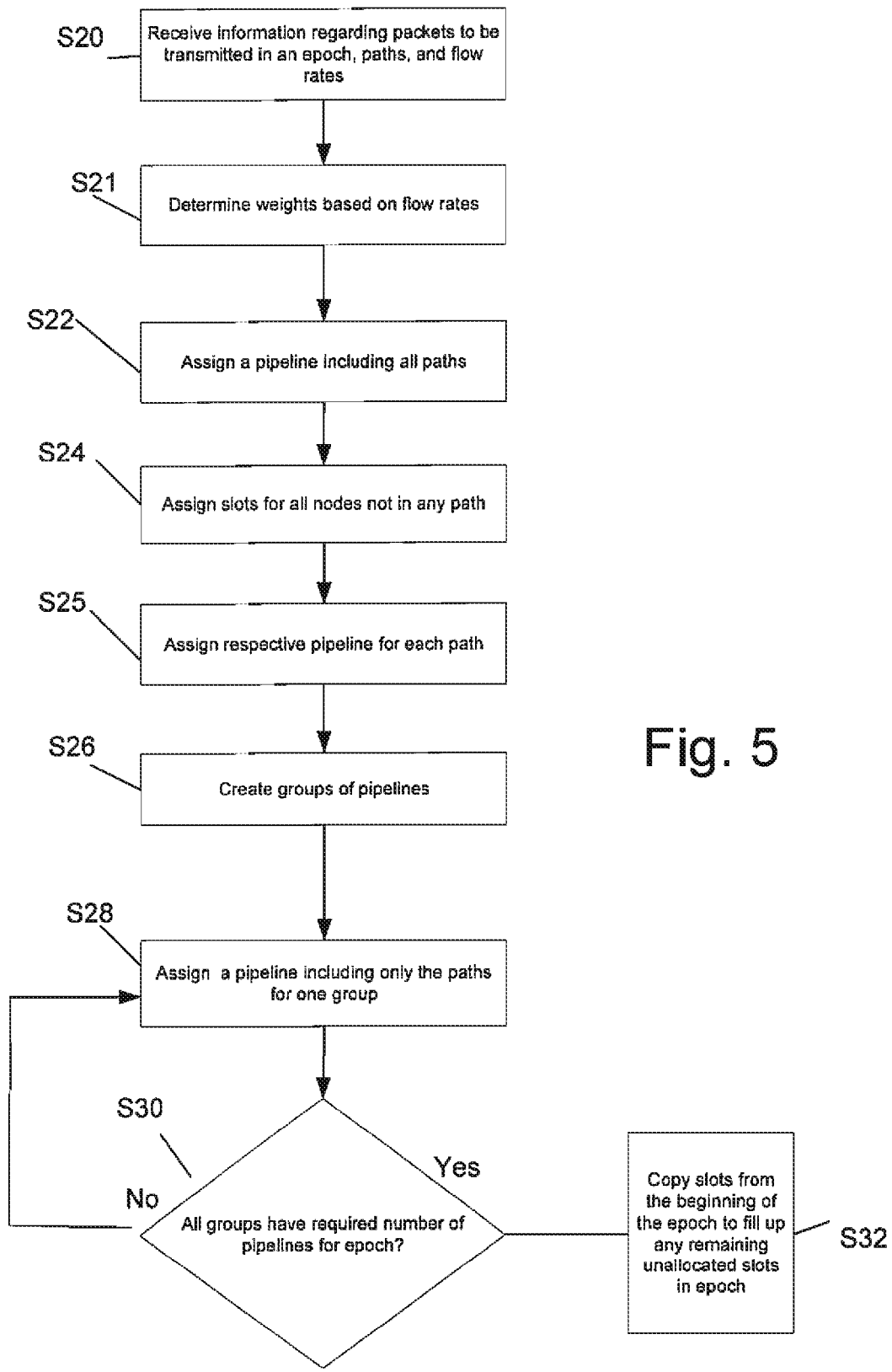
FIG. 5 is a flow diagram of a process which could be performed in accordance with an embodiment of the invention.

Referring to FIG. 5, an input load aware schedule algorithm is shown that meets application throughput and end-to-end delay performance requirements.

This scheduling algorithm is applicable in network scenarios where the network knows the user traffic throughput requirement and end-to-end delay performance. The path trace information is still used.

In this scheduling algorithm, each path is given a weight from 0 to 1. The total number of pipelines per epoch is then calculated based on a number of additional pipelines required for a path. The number of additional pipelines required for a path is calculated by:

$$\text{Additional\_PipelinesRequiredforPath}_i \text{ per epoch} = \text{Weight}_i * \frac{\text{EPOCH\_LENGTH} - (\text{Minimum\_Required\_Slots})}{\min(3, \text{path\_length}_i)}$$

where Minimum_Required_Slots is the number of slots in a pipeline with all paths plus any slots needed to be allocated to orphan nodes that are not part of any path. The weight therefore is an indication of throughput requirement. The calculation of the weight is left up to the system gathering throughput and delay requirements. With the given number of additional pipelines required calculated for each path per epoch, groups of pipelines are created. The number of times each group is assigned in the epoch is based on the number of additional pipelines that are required for any one path in the group during an epoch. For paths that still require more pipelines per epoch, groups including these paths are added to the epoch. The pipelines for the different groups are assigned in an alternating manner. Referring to FIG. 5, steps that may be used in this algorithm are:

S20. Receive information regarding packets to be transmitted in an epoch, paths, and flow rates.
S21. Determine weights for paths based on flow rates.
S22. Assign a pipeline for each path and all paths. This could be performed using the algorithms discussed above.
S24. Assign slots for all nodes not in any path.
S25. Assign a respective pipeline for each path.
S26. Create groups of pipelines.
S28. Assign a pipeline including only the paths for one group in the groups of pipelines list.
S30. Repeat step S28 until all the groups have their required number of pipelines for the epoch.
S32. Copy slots from the beginning of epoch to fill up any remaining unallocated slots in epoch.

Below is pseudo-code describing the operation of an input load aware scheduling algorithm where the destination node is considered as an orphan node.

Main Process

```
Input = {list of all paths, list of all nodes in the network,
   nodes' processing_delay}
   Output = {time slot assignment for all nodes in the network in an
   epoch}
Clear Schedule
Allocate Pipeline {list of all paths, processing delay}
Allocate_Slots {list of orphan nodes, processing delay}
Group List = Create_Path_Group_List {see parameters below}
Current_group = Group_List head
While Group_List is not empty
   Allocate Pipeline (current_group.path_list)
   Current_group.count = Current_group.count − 1
```

-continued

```
    If current_group.count = 0 then
        remove current_group from Group_List
    else
        current_group = next Group in list
    end if
end While loop
```

Allocate Pipeline

```
Input = {list of paths, nodes' processing delay}
Output = {time slot(s) reserved for each node and for all
nodes in all paths from the input list with processing delay at
each node taking into consideration}
For w =1 to path list
    For k=1 to nodes in path(w)
        Allocate Slots {node(w,k), processing delay}
    end For k Loop
end For w Loop
```

Create_Path_Group_List

```
Inputs = {list of all paths; required slots per epoch for each path;
processing_delay + 1}
Output = {Circular List of path Groups}
Count=0
While path list is not empty
    Find paths with fewest required slots
    Create a new Group node
    Group.Count = required pipelines – Count
    Count = Count + Group.Count
    Group.path_list = input path list
    add Group to output list
    remove paths with fewest required slots from input path list
end While loop
```

Allocate Slots

```
Input = {node list, processing delay}
Output = {each node in the list assigned to 1slot}
For i=1 to node list
    x = slot index of a Spatial Reuse Slot Available for node(i)
    If slot x is valid then
        Assign node(i) to slot x considering processing delay
    else
        Find next free slot in the epoch
        Assign node(w,k) to this free slot considering the
        node's processing delay.
    end if
end For i loop
```

Spatial Reuse Slot Available is considered "valid" if a slot already reserved for one node can be reused for another node based on the 2-hop spatial re-use assumption.

Below is an example of an application of the input load aware scheduling algorithm. Assume a network with the format

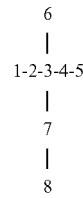

The link rate is 1 Mbps and supports 25 slots per epoch. The flow from node 1 to node 5 is 240 Kbps (or 6 slots per second) and from node 6 to node 8 is only 120 Kbps (or 3 slots per second) The weighing (Step S21) would be as follows:

Path 0: node 1 to 5 0.67
Path 1: node 6 to 8 0.33

Step S22 dictates assigning one pipeline including all paths (here from node 1 to node 5 and node 6 to node 8). The algorithm discussed above, in FIG. 4 and steps S4, S6 and S8 may be used.

| Slot | \multicolumn{8}{c}{Node} |
|---|---|---|---|---|---|---|---|---|
|  | 1 | 2 | 3 | 4 | 5 | 6 | 7 | 8 |
| 1 | T |   |   |   |   | T |   |   |
| 2 |   | T |   |   |   |   |   |   |
| 3 |   |   | T |   |   |   |   |   |
| 4 |   |   |   | T |   |   |   |   |
| 5 |   |   |   |   | T |   | T |   |

At this time all nodes except nodes 8 and 5 have a transmit opportunity. In order to guarantee that there will be a slot for all nodes, in accordance with step S24 nodes 8 and 5 are assigned a transmit slot.

| Slot | \multicolumn{8}{c}{Node} |
|---|---|---|---|---|---|---|---|---|
|  | 1 | 2 | 3 | 4 | 5 | 6 | 7 | 8 |
| 1 | T |   |   |   | T | T |   | T |
| 2 |   | T |   |   |   |   |   |   |
| 3 |   |   | T |   |   |   |   |   |
| 4 |   |   |   | T |   |   |   |   |
| 5 |   |   |   |   | T |   | T |   |

$$Additional\_Pipelines\_Required\_for\_Path_0 = 0.67 * \frac{20}{3}$$
$$= 4.46 \text{ roundup}$$
$$= 5$$

$$Additional\_Piepines\_Required\_for\_Path_1 = 0.33 * \frac{20}{3}$$
$$= 2.2 \text{ rounddown}$$
$$= 2$$

At step S25, the algorithm assigns respective pipelines for each of the paths. Now in step S26, the scheduling algorithm may create groups of pipelines and determines a number of times (Count) that each group will be assigned to the schedule based on the flow's weights. The groups may be used to satisfy transmission requirements and distribute the pipelines across the epoch. The algorithm may start with a first group (Group 1) including a pipeline with both paths. The minimum number of additional pipelines in each epoch required for paths 0 and 1 is 2, and so the scheduling algorithm assigns Group 1 (the pipeline that includes both paths 0 and 1) twice (Count=2). After Group 1 is assigned twice in an epoch, path 0 still has more slots required (5 total minus 2 assigned=3 pipelines to be assigned) and so the scheduling algorithm creates a Group 2 including a pipeline with path 0 only. The table below shows the final groups of pipelines using the pipeline grouping allocation method and the number of times each group may be assigned based on that method to satisfy transmission requirements.

|  | Group | |
|---|---|---|
|  | 1 | 2 |
| Paths | 0&1 | 0 |
| Count | 2 | 3 |

Now that the groups are created, the assignment of the epoch in accordance with steps S28 and S30 includes alternating between the two groups until the count above is satisfied.

| | Node | | | | | | | | |
|---|---|---|---|---|---|---|---|---|---|
| Slot | 1 | 2 | 3 | 4 | 5 | 6 | 7 | 8 | |
| 1 | T | | | | T | T | | T | 1-5 Full Pipeline with Orphaned nodes using spatial reuse. |
| 2 | | T | | | | | | | |
| 3 | | | T | | | | | | |
| 4 | | | T | | | | | | |
| 5 | | | | | T | | T | | |
| 6 | T | | | | | T | | | 6-10 1$^{st}$ Pipeline allocated for Group1 |
| 7 | | T | | | | | | | |
| 8 | | | T | | | | | | |
| 9 | | | T | | | | | | |
| 10 | | | | T | | T | | | |
| 11 | T | | | T | | | | | 11-13 1$^{st}$ Pipeline allocated for Group2 |
| 12 | | T | | | | | | | |
| 13 | | | T | | | | | | |
| 14 | T | | | | | T | | | 14-18 2$^{nd}$ Pipeline allocated for Group1 |
| 15 | | T | | | | | | | |
| 16 | | | T | | | | | | |
| 17 | | | T | | | | | | |
| 18 | | | | T | | T | | | |
| 19 | T | | | T | | | | | 19-21 2$^{nd}$ Pipeline allocated for Group2 |
| 20 | | T | | | | | | | |
| 21 | | | T | | | | | | |
| 22 | T | | | T | | | | | 22-24 3$^{rd}$ Pipeline allocated for Group2 |
| 23 | | T | | | | | | | |
| 24 | | | T | | | | | | |
| 25 | T | | | | T | T | | T | 25 Copy slot 1 assignment to fill in the rest of the epoch (step S32) |

The analysis of the above schedule was performed assuming a random arrival rate. To calculate the average time from packet creation to first transmit one could average the distance between the transmission slots of the source node. The average time from packet creation to first transmit for each path are:
node 1 to 5=4.17 Slots
node 6 to 8=8.67 Slots
This is due to the different number of transmit opportunities for each flow. The time spent in transmission on an intermediate node is:
node 1 to 5=7.13 Slots
node 6 to 8=5 Slots
TOTAL end to end delay
node 1 to 5=7.13+4.17=11.3 Slots
node 6 to 8=8.67+5=13.67 Slots The packet transmitted out of node 1 in slot 22 will be transmitted by node 2 and 3 before the end of the epoch, but will be stuck at node 4 waiting for a slot. This is a direct result of using spatial reuse when calculating the pipeline for a single path.

Figure 6:
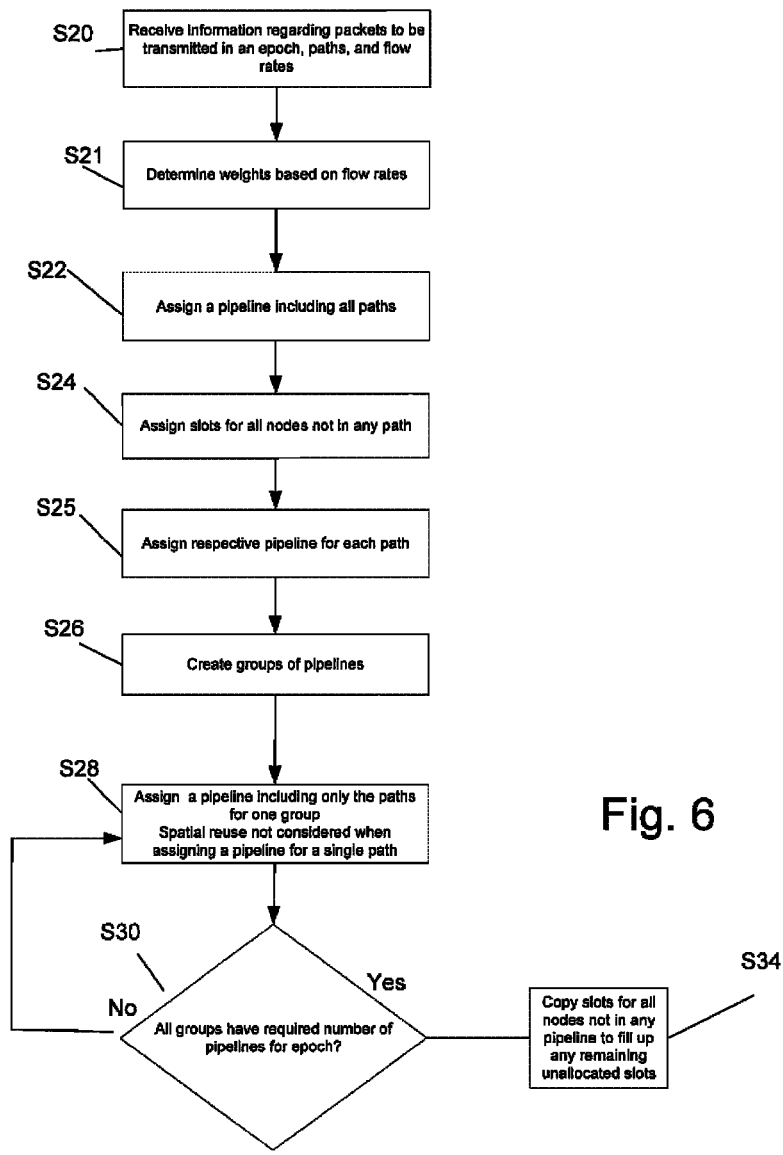
FIG. 6 is a flow diagram of a process which could be performed in accordance with an embodiment of the invention.

The process in FIG. 5 may be modified as shown in FIG. 6 to produce an input load aware scheduling algorithm with complete pipelines that will meet the application throughput and end-to-end delay performance requirements, and not trap any nodes in the middle of the path.

This scheduling algorithm is almost identical to the one previously described except that when assigning a pipeline, spatial reuse is not considered for a single path. This means that the lower bound for the optimal pipeline size is equal to the path length of the longest path in the pipeline.

The Steps for the full algorithm are:
S20. Receive information regarding packets to be transmitted in an epoch, paths, and flow rates.
S21. Determine weights for paths based on flow rates.
S22. Assign a pipeline including all paths. This could be performed using the algorithms discussed above.
S24. Assign slots for all nodes not in any path.
S25. Assign a respective pipeline for each path.
S26. Create groups of pipelines.
S28. Assign a pipeline including only the paths for one group in the groups of pipelines list.
S30. Repeat step S28 until all the groups have their required number of pipelines for the epoch.
S34. Copy slots for all nodes not in any pipeline to fill up any remaining unallocated slots.
The same example is used for illustration:

The link rate is 1 Mbps and 25 slots per second. The flow from node 1 to 5 is 240 Kbps (or 6 time slots per second) and from node 6 to 8 is only 120 Kbps (3 time slots per second). The weighing (Step S21) would be as follows:
Path 0: node 1 to 5 0.67
Path 1: node 6 to 8 0.33
Step 22 dictates assigning one pipeline including all paths

| | Node | | | | | | | |
|---|---|---|---|---|---|---|---|---|
| Slot | 1 | 2 | 3 | 4 | 5 | 6 | 7 | 8 |
| 1 | T | | | | | T | | |
| 2 | | T | | | | | | |
| 3 | | | T | | | | | |
| 4 | | | T | | | | | |
| 5 | | | | | T | | T | |

This pipeline is the same as before because no node on path 1 to 5 could reuse any of the slots due to nodes on the path from 6 to 8. The difference is in the pipeline for just a path from node 1 to 5.

|      |   |   |   | Node |   |   |   |   |
| ---- | - | - | - | ---- | - | - | - | - |
| Slot | 1 | 2 | 3 | 4    | 5 | 6 | 7 | 8 |
| 1    | T |   |   |      |   |   |   |   |
| 2    |   | T |   |      |   |   |   |   |
| 3    |   |   | T |      |   |   |   |   |
| 4    |   |   |   | T    |   |   |   |   |

Since the first node is allowed to use full spatial reuse, the paths interleave differently.

|      |   |   |   | Node |   |   |   |   |
| ---- | - | - | - | ---- | - | - | - | - |
| Slot | 1 | 2 | 3 | 4    | 5 | 6 | 7 | 8 |
| 1    | T |   |   |      | T | T |   | T |
| 2    |   | T |   |      |   |   |   |   |
| 3    |   |   | T |      |   |   |   |   |
| 4    |   |   |   | T    |   |   |   |   |
| 5    | T |   |   |      | T |   | T |   |
| 6    |   |   |   |      |   | T |   |   |
| 7    |   | T |   |      |   |   |   |   |
| 8    |   |   | T |      |   |   |   |   |
| 9    |   |   | T |      |   |   |   |   |
| 10   | T |   |   |      | T |   | T |   |
| 11   |   | T |   |      |   |   |   |   |
| 12   |   |   |   | T    |   |   |   |   |
| 13   | T |   |   |      | T |   |   |   |
| 14   |   |   |   |      |   | T |   |   |
| 15   |   | T |   |      |   |   |   |   |
| 16   |   |   | T |      |   |   |   |   |
| 17   |   |   | T |      |   |   |   |   |
| 18   | T |   |   |      | T |   | T |   |
| 19   |   | T |   |      |   |   |   |   |
| 20   |   |   | T |      |   |   |   |   |
| 21   | T |   |   |      | T |   |   |   |
| 22   |   | T |   |      |   |   |   |   |
| 23   |   |   | T |      |   |   |   |   |
| 24   |   |   |   | T    |   |   |   |   |
| 25   |   |   |   |      | T |   | T |   |

Analysis of the schedule compared to the prior shown schedule shows that the average distance between source node transmissions are the same for both paths. The difference is in the time spent in the intermediate nodes. Below is a summary of the analysis:

node 1 to 5=4.83 Slots spent in intermediate nodes+4.17 slots spent waiting for first transmission=9 slots.

node 6 to 8=5 Slots spent in intermediate nodes+8.67 slots spent waiting for first transmission=13.67 slots.

The link capacity is fixed and determined by the PHY layer. The achievable network capacity is influenced by the effectiveness of the waveform's traffic management tools. The scheduling algorithms presented are another traffic management tool and help organize the transmission ordering in the network per decisions made by the routing layer to minimize the delay and maximize throughput.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A node in a wireless communication network, the node comprising:
    an antenna;
    a transmitter in communication with the antenna; and
    a processor in communication with the transmitter; wherein
    the processor is effective to
        receive information regarding a plurality of packets to be transmitted from a source node and a path of nodes for the packets;
        assign a schedule of slots for the packets, where assigning the schedule includes the steps performed by the processor being effective to
            assign a first slot to the source node;
            assign a next slot to a next node in the path, the next slot being at a first time that the next node can transmit after receiving one of the packets;
            repeat the step of assigning the next slot until all nodes in the path are assigned; and
            assign a respective another slot for each orphan node not in the path.

2. The node as recited in claim 1, wherein the processor is further effective to repeat the schedule to fill an epoch.

3. The node as recited in claim 1, wherein the assign the next slot is performed using spatial reuse.

4. The node as recited in claim 1, wherein the assign the respective another slot includes the processor being effective to assign at least one of the orphan nodes to a top of the schedule.

5. The node as recited in claim 1, wherein the assign the respective another slot is performed using spatial reuse.

6. A node in a communication network, the node comprising:
    an antenna;
    a transmitter in communication with the antenna; and
    a processor in communication with the transmitter;
    the processor effective to
        receive information regarding a first plurality of packets to be transmitted in an epoch, a first path of nodes for the first plurality of packets, and a first flow rate;
        receive information regarding a second plurality of packets to be transmitted in the epoch, a second path of nodes for the second plurality of packets, and a second flow rate;
        determine a first weight for the first path based on the first and second flow rate;
        determine a second weight for the second path based on the first and second flow rate;
        assign a first pipeline of slots for both the first and second path;
        assign slots for any orphan nodes not in the first and second paths;
        assign a second pipeline of slots for the first path;
        assign a third pipeline of slots for the second path;
        assign the first pipeline to a schedule;
        assign at least one of the pipelines to the schedule based on the first and second weights.

7. The node as recited in claim 6, wherein the processor is effective to assign the at least one of the pipelines to the schedule by alternating the pipelines.

8. The node as recited in claim 6, wherein:
    the first path includes a first source node;
    the second path include a second source node;

the processor is effective to assign the first pipeline by being effective to
assign a first slot to the first source node;
assign a first next slot to a first next node in the first path, the first next slot being at a first time that the first next node can transmit after receiving one of the packets;
repeat the assign the first next slot until all nodes in the first path are assigned;
assign a third slot to the second source node;
assign a second next slot to a second next node in the second path, the second next slot being at a first time that the second next node can transmit after receiving one of the packets; and
repeat the assign the second next slot until all nodes in the second path are assigned.

9. The node as recited in claim 8, wherein the processor is further effective to copy slot assignments from a beginning of the epoch to fill in unallocated slots in the epoch.

10. The node as recited in claim 8, wherein the processor is further effective to copy slot assignments for nodes not in any path to fill in unallocated slots in the epoch.

11. The node as recited in claim 6, wherein the assign the first and second next slot is performed using spatial reuse.

12. The node as recited in claim 6, wherein the assign slots for any orphan nodes includes assigning one of the orphan nodes to a top of the schedule.

13. The node as recited in claim 6, wherein the assign slots in the first pipeline for any orphan nodes is performed using spatial reuse.

14. A method for assigning a schedule for transmission ordering in a wireless communication network, the method comprising:
receiving, by a processor, information regarding a plurality of packets to be
transmitted from
a source node and a path of nodes for the packets; and
assigning, by the processor, a schedule of slots for the packets by performing the steps of
assigning a first slot to the source node;
assigning a next slot to a next node in the path, the next slot being at a first time that the next node can transmit after receiving one of the packets;
repeating the step of assigning the next slot until all nodes in the path are assigned; and
assigning a respective another slot for each orphan node not in the path.

15. The method as recited in claim 14, wherein:
receiving information includes receiving information for a first plurality of packets to be transmitted in an epoch, a first path for the first plurality of packets, and a first flow rate;
assigning a schedule of slots includes assigning a first schedule of slots for the first plurality of packets;
the method further comprises
receiving, by the processor, information for a second plurality of packets to be
transmitted in the epoch, a second path for the second plurality of packets, and a second flow rate;
determining, by the processor, a first weight for the first path based on the first and second flow rate;
determining, by the processor, a second weight for the second path based on the first and second flow rate;
assigning, by the processor, a first pipeline of slots for both the first and second path;
assigning, by the processor, slots for any orphan nodes not in the first and second paths;
assigning, by the processor, a second pipeline of slots for the first path;
assigning, by the processor, a third pipeline of slots for the second path;
assigning, by the processor, the first pipeline to a schedule; and
assigning, by the processor, at least one of the pipelines to the schedule based on the first and second weights.

16. The method as recited in claim 15, further comprising copying slot assignments from a beginning of the epoch to fill in unallocated slots in the epoch.

17. The method as recited in claim 15, further comprising copying slots assignments for nodes not in any path to fill in unallocated slots in the epoch.

18. The method as recited in claim 14, further comprising repeating the schedule to fill the epoch.

19. The method as recited in claim 14, wherein assigning the next slot is performed using spatial reuse.

20. The method as recited in claim 14, wherein assigning the respective another slot includes assigning at least one of the orphan nodes to a top of the schedule.

* * * * *